J. C. MENY.
HAT PIN AND GUARD THEREFOR.
APPLICATION FILED MAY 2, 1911.
1,057,572.
Patented Apr. 1, 1913.
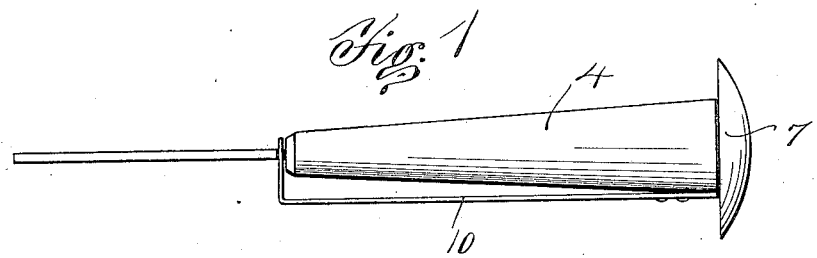
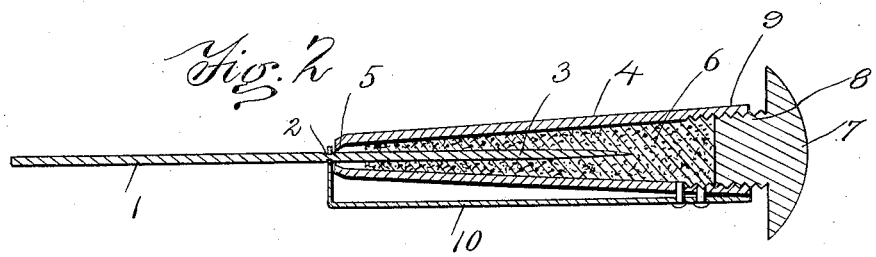
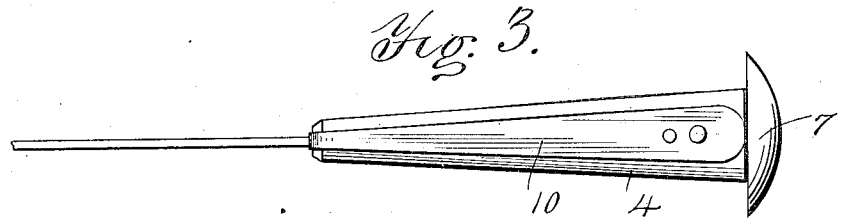
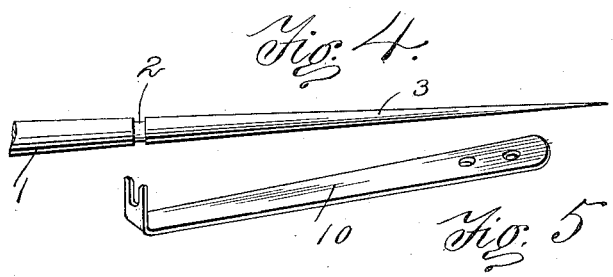
WITNESSES
INVENTOR
Joseph C. Meny
Attorney
COLUMBIA PLANOGRAPH CO., WASHINGTON, D. C.

UNITED STATES PATENT OFFICE.

JOSEPH C. MENY, OF GERMANTOWN, PENNSYLVANIA.

HAT-PIN AND GUARD THEREFOR.

1,057,572.  Specification of Letters Patent.  Patented Apr. 1, 1913.

Application filed May 2, 1911. Serial No. 624,621.

*To all whom it may concern:*

Be it known that I, JOSEPH C. MENY, citizen of the United States, residing at Germantown, in the county of Philadelphia and State of Pennsylvania, have invented certain new and useful Improvements in Hat-Pins and Guards Therefor, of which the following is a specification.

This invention relates to improvements in a hat pin and guard therefor and the object thereof is to provide a hat pin having means whereby it may be secured against loss.

Another and the main object of the invention is to provide means for guarding the point of a hat pin whereby it cannot cause accidental injury while being worn.

With the above and other objects in view I have invented the device illustrated in the accompanying drawings in which—

Figure 1 is an elevational view of my device, the pin being partially broken away, Fig. 2 is a longitudinal sectional view thereof showing a plug before being forced to its innermost position, Fig. 3 is another elevation thereof, Fig. 4 is an enlarged detail view of the point end of a pin and Fig. 5 is a perspective detail view of a clamp member.

Like reference characters indicate like parts throughout the specification and in several views in the drawings in which—

1 indicates a hat pin having an annular groove 2 therein near its point end 3.

4 is a conical guard having an opening 5 in its small end in which the pin point 3 is adapted to enter. The guard 4 is hollow and is filled with a cone shaped cork 6 into which the pin point is adapted to be forced whereby said guard is held in connection with the pin. The cork 6 is made somewhat too large to snugly fit into the forward end of the guard, as constant use will cause the pin to wear a loose opening in the cork, the head 7 having a screw threaded plug 8 thereon adapted to screw down into the large end 9 of the guard 4 gradually as the pin wears an opening in the cork thus causing said opening to be closed as the plug is screwed against the cork forcing it farther and farther into the small end of the guard.

Onto the outer side of the guard 4 is riveted a spring member 10 having a right angular bifurcated free end 11 which is adapted to engage the groove 2 of the pin and thereby hold the guard onto the pin. This spring member may be eliminated if desired and any common pin used in connection with the guard. Also rubber or other suitable material may be substituted for the cork.

After the pin is inserted into the cork the cap may be screwed in, thereby wedging the cork around the pin.

Having described my invention that which I claim to be new and desire to procure by Letters Patent is—

1. A pin guard, a filler therein, and means for wedging said filler in said guard, said guard being conical and hollow and having an opening in the small end thereof, said filler being conical and relatively larger in circumference than the inner portion of the cavity of said guard, said wedging means being a plug adapted to screw into the larger end of said guard and gradually force said filler toward the small end of said guard, and a spring clasp fixed to the outer side of said guard for engaging a pin.

2. A hat pin guard consisting of a member having a conical cavity therein and an opening in the small end thereof, a filler relatively larger than the smaller end of said cavity, and means for slidably forcing said filler toward the small end of said cavity, whereby said filler is compressed.

3. A hat-pin guard including a compressible body into which the point of the pin is adapted to be pushed and retained by the clamping action of the material, an inclosure holding said body and having an aperture for the insertion of the pin; said inclosure being conical, and means for forcing the compressible body toward the small end of the cone, said end having normally a clearing space to permit endwise motion of the compressible body.

In testimony whereof I affix my signature in presence of two witnesses.

JOSEPH C. MENY.

Witnesses:
 WILLIAM A. GROFF,
 WILLIAM O'BRIEN.

Copies of this patent may be obtained for five cents each, by addressing the "Commissioner of Patents, Washington, D. C."